Aug. 20, 1968  A. G. DAVIES  3,397,611

EXPOSURE CONTROL APPARATUS

Filed July 1, 1965

United States Patent Office 3,397,611
Patented Aug. 20, 1968

3,397,611
EXPOSURE CONTROL APPARATUS
Arthur Gordon Davies, London, England, assignor to
Medical and Electrical Instrumentation Company
Limited, London, England, a British company
Filed July 1, 1965, Ser. No. 468,816
Claims priority, application Great Britain, Nov. 14, 1964,
46,457/64
6 Claims. (Cl. 88—24)

ABSTRACT OF THE DISCLOSURE

Exposure control apparatus, particularly suitable for a photographic enlarger, has a photo-sensitive device responsive to the radiation, e.g. light transmitted through a photographic negative, which photo-sensitive device is connected in a bridge circuit with adjustable ratio arms and with an adjustable balancing impedance. When the bridge is balanced, the balancing impedance is switched out of the bridge circuit into a timing circuit to control the duration of energization of the radiation source, e.g. the enlarger lamp. A further switch may be provided to initiate operation of the timing circuit, which circuit may include a further adjustable element to adjust the ratio between the time period and the magnitude of the balancing impedance.

---

Figure 1:
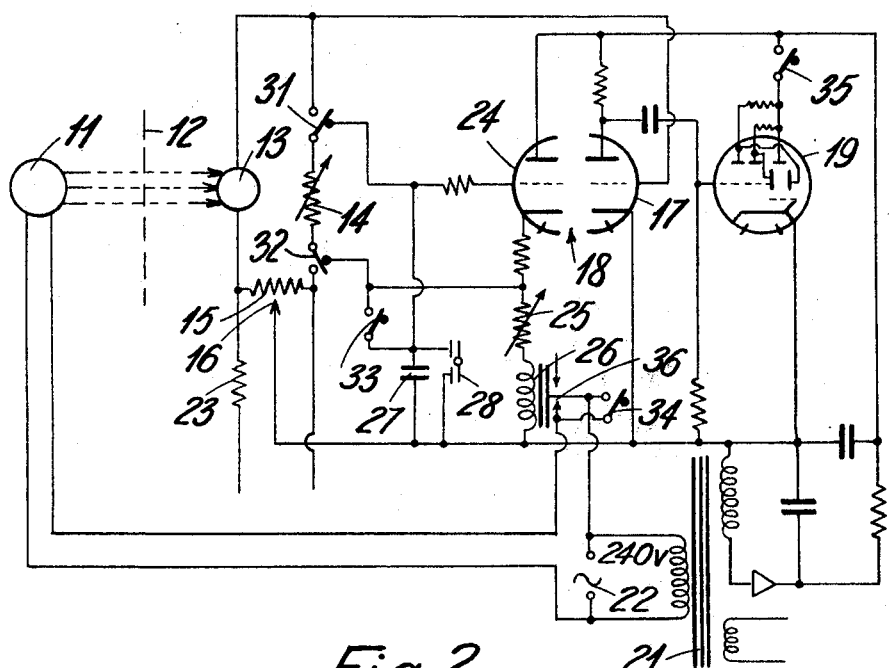

This invention relates to a method of exposure control, and exposure control apparatus.

According to one aspect of this invention there is provided exposure control apparatus for controlling the energisation of a light source, comprising a photo-sensitive device arranged to receive light from the light source, the resistance of the photo-sensitive device being dependent upon the quantity of light falling upon the device, an element whose impedance is variable, and a timing circuit responsive to the impedance of the element for controlling the energisation of the light source. The required exposure will depend upon the transmission of light through the medium in use, such as a negative photograph. The impedance of the element can be adjusted in relation to the impedance of the photo-sensitive device when illuminated by the light source through the medium, and at any subsequent time the timing circuit can be operated to control the time of exposure, for example of light-sensitive paper, so that the total quantity of light falling on the light-sensitive paper is the correct value.

The photo-sensitive device is preferably arranged to be movable over an area to receive light from the light source from different portions of the medium.

Comparison means may be provided to relate the impedance of the element to that of the photo-sensitive device. This comparison means may be calibrated in terms of the various qualities of light sensitive papers, for example. The comparison means may be operated manually or automatically to vary the impedance of the element to the required relation to that of the photo-sensitive device.

Switch means may be provided to connect the element alternatively to the comparison means or to the timing circuit. In a first position of the switch means, the impedance of the element is adjusted to the required relation to the impedance of the photo-sensitive device, and on operation of the switch means the adjusted element is connected to the timing circuit for controlling the exposure in accordance with the quantity of light which was falling on the photo-sensitive device when the switch was in its first position. The apparatus may include indicating means connected to the output of the comparison means for indicating the relationship between the impedances of the element and of the photo-sensitive device. The indicating means may include an amplifying stage.

According to another aspect of this invention, there is provided a method of controlling exposure, comprising applying light through a medium to a photo-sensitive device whose impedance varies with the quantity of light falling upon the device, adjusting an impedance in response to the impedance of the photo-sensitive device when the light is applied to the device and timing the exposure in response to the value of the adjusted impedance.

The impedance is preferably made equal to the impedance of the photo-sensitive device.

The invention includes within its scope an enlarger comprising exposure control apparatus as described above, the timing circuit being connected to the light source for exposing a light sensitive medium through a negative photograph.

Figure 2:
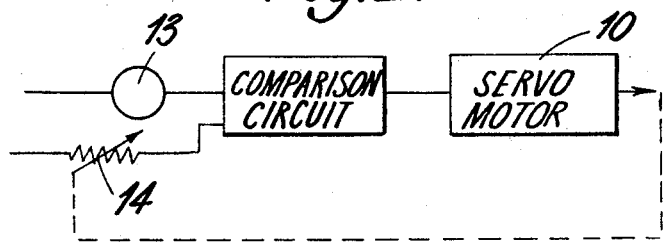

An example of the invention will now be described with reference to the accompanying drawing in which:

FIGURE 1 is a diagram of apparatus for controlling the exposure in enlarging apparatus, and FIGURE 2 is a diagram of a modification of the apparatus of FIGURE 1.

In the apparatus shown in FIGURE 1, light from the lamp 11 is directed through a negative photograph 12 on to a photo-conductive cell 13. The cell 13 is movable in the image plane of the photograph 12 to receive light from any selected region of the negative photograph 12, so that the exposure may be controlled in accordance with the transmission of the most important part of the negative photograph.

The cell 13 has a resistance which varies in accordance with the quantity of light falling upon the cell. The cell 13 is connected in one arm of a resistance bridge, one adjacent arm of the bridge being formed by a variable resistor 14, and the other two arms being formed by a potentiometer 15, the junction between the other two arms occurring at the tap 16 of the potentiometer. The bridge is balanced by adjusting the resistance of the resistor 14. The condition for balance can be adjusted by moving the tap 16 of the potentiometer so that at balance the ratio of the resistance of the cell 13 to that of the resistor 14 is equal to the ratio of the resistances on either side of the tap of the potentiometer. This condition is normally that the resistances of 13 and 14 are equal.

The output of the bridge is fed to the grid of the one half 17 of a double triode 18 the output of the said half 17 being connected to a magic eye indicator 19. On balance of the bridge, the indicator 19 gives a null indication. The heater supply and the direct voltage supply to the valves is derived from a transformer 21 fed by the mains 22 and the bridge is fed from the heater supply through a limiting resistor 23. The lamp 11 is also energised from the mains supply 22.

The second half 24 of the double triode 18 has a variable resistor 25 and relay coil 26 in its cathode circuit. The variable resistor 14 is connected to a capacitor 27 in the grid circuit of the second half 24 of the double triode.

A 5 pole 2 way selector switch is provided to connect the circuit alternatively for balancing the bridge and for timing the energisation of the lamp 11. A second switch 28 is provided to short circuit the capacitor. Two poles 31, 32 of the selector switch connect the resistor 14 alternatively in the resistance bridge or to the grid circuit of the second half 24 of the double triode. A third pole 33 of the selector switch is provided to apply a short circuit across the grid circuit of the second half of the double triode when the resistor 14 is not connected thereto to maintain the triode 24 fully conducting. A fourth pole 34 of the selector is connected in parallel with contacts 36 of the relay 26 to connect the lamp 11 across the mains supply. The fifth pole 35 of the selector switch is arranged to connect the direct voltage supply to the magic eye indicator 19. The relay 26 is arranged to connect the lamp 11 across the mains 22 when the relay coil is de-energised, and to open the contacts 36 when the relay coil is energised. In the diagram, the poles 31 to 35 of the selector switch are shown in their timing position.

In operation, the photo cell 13 is arranged in the image plane of the negative to receive light from the lamp 11 through the most important portion of the negative 12 in the enlarger, for example, a highlight in the negative. The selector switch is switched to the balance position in which the contacts contact the pole opposite to that with which the contacts are shown in contact in FIGURE 1. The contacts 31 and 32 complete the connection of the resistance bridge whose output is applied to the grid of the first triode 17. The first triode output is applied to the magic eye indicator 19. The value of the resistor 14 is adjusted until a null indication is obtained at the magic eye 19.

The selector switch is then set to the time position, in which the contacts 31 to 35 are in the positions shown in FIGURE 1. The capacitor 27, which has been charged by the current through the second triode 24 when the selector switch was in the balance position, maintains the second triode conducting. The current from the second triode energises the relay 26 to open the contacts 36, so that the lamp 11 is de-energised. The light-sensitive paper can now be inserted in position in the image plane of the negative 12.

On momentary closing of the second switch 28, the capacitor is discharged to reduce the signal applied to the grid of the second triode 24 below the cut off value. The relay coil 26 is now de-energised so that the contacts 36 close to energise the lamp 11 to begin the exposure of the paper. As soon as the second switch 28 is re-opened the capacitor 27 starts to charge up through the resistor 14 at a rate dependent upon the resistance of the resistor 14. When the signal applied to the grid of the second triode 24 reaches a level sufficient to switch the second triode on, the relay coil 26 is re-energised and the contacts 36 are opened to stop the exposure. The exposed paper can now be removed and further prints can be taken, inserting new sheets of paper and monentarily closing the second switch to re-start the exposure.

I have found that the exposure period may be varied in a linear manner over the usual range of light intensities used in photographic enlarging. The range may be extended by the use of neutral density filters or varying apertures over the photo-sensitive cell.

The position of the tap 16 on the potentiometer 15 is adjusted to suit the qualities of the paper being exposed in the enlarger. When a paper has a quality which requires only a short exposure, the tap 16 is adjusted so that the bridge balances when the ratio of the resistance of resistor 14 to that of the photo electric cell 13 is low. The potentiometer 15 is conveniently calibrated in terms of the various qualities of paper to be used.

The photo-electric cell 13 may be replaced by an electron multiplier, photo-resistor, photo conductive cell, selenium cell or any device capable of converting a change in light intensity to an electrical variable. The bridge may compare the capacity, inductance or an electronic impedance, rather than the resistance of the photo cell and comparison element in the comparison bridge. The particular components of the circuit described may be replaced by other components having similar functions.

Since many of the photo transducers have a limited range over which linearity between light intensity and signal output is strictly observed, the photo transducer may be used with optical density filters, colour filters for colour reproduction and colour balancing and exposure control and means of mechanical aperture control of the transducer. The adjustment of the comparison element in the comparison bridge may be effected as described above by manual adjustment, or it may be effected by a servo motor 10 for example as illustrated in FIGURE 2 where it is illustrated mechanically connected to vary the resistor 14. This servo system should retain the value of the comparison element at the balance value after balance has been obtained, although the impedance of the photo-sensitive device will of course change when the lamp is switched off. The selector switch may be an electro-magnetic or electronic relay, a servo-motor. The magic eye valve 19 described above can be replaced for example by a meter or twin neons.

The apparatus may be calibrated with test strips of photo-sensitive paper which are exposed for various periods until the correct period is determined for that paper. The photo-electric cell 13 is arranged in the image plane to receive light from a selected portion of the negative 12 and the tap 16 of the potentiometer 15 is arranged in a central position. The selector switch is placed in the balance position and the bridge is balanced by adjusting the resistance of the resistor 14. The selector switch is then placed in the second position and second switch 28 is then momentarily depressed. The circuit connected to the second triode 24 will then energise the lamp 11 for a period dependent upon its time constant. The variable resistor 25 is adjusted until the period of energisation of the lamp 11 is equal to the desired period of exposure of the test strip of light-sensitive paper. The variable resistor 25 is not subsequently varied, the tap 16 of the potentiometer 15 being adjusted for photo-sensitive papers of differing qualities. The qualities of the photo-sensitive papers can be measured by means of the test strip method or by adjusting the position of the tap 16 on the potentiometer 15 according to the results obtained when the paper is exposed with the potentiometer tap in the central position.

The apparatus may also be used as a densitometer, to select a correct grade of paper for a negative. This is done by measuring the maximum and minimum brightness areas, noting the value of the resistor 14 for both maximum and minimum. The contrast ratio in the negative is the ratio of one exposure reading to the other and the correct grade of paper can be selected from this result.

The apparatus described has the advantage that the information about light intensity is stored to control the exposure period at a subsequent time. The apparatus can take into account the various qualities of printing papers, and may be used to measure the contrast range of negatives, and paper speeds. The apparatus is simple in that the measurement of light intensity is carried out at a different time from the exposure of the printing paper, so that complex apparatus required to carry these operations out simultaneously is not required. The apparatus measures the light intensity by a simple method, and avoids the use of test strips in the measurement of light intensity or guesswork or the need for judgement from experience.

I claim:

1. Exposure control apparatus for controlling the energization of a light source, comprising a photo-sensitive device arranged to receive light from the light source, the resistance of the photo-sensitive device being dependent upon the quantity of light falling upon the device, a potentiometer having an adjustable tap, an element whose impedance is variable, said photo-sensitive device constituting a first arm of a bridge circuit, said potentiometer constituting second and third adjustable arms of said bridge circuit, and said element constituting a fourth arm for balancing the bridge, indicator means for detecting balance of the bridge whereby the impedance of the element can be adjusted to be related to that of the photosensitive device, a timing circuit, and switch means for alternatively connecting said element in said bridge circuit or said timing crcuit, said timing circut being responsive to the impedance of said element and controlling the energization of the light source.

2. Exposure control apparatus for controlling the duration of energization of a source of radiation comprising an electric bridge circuit consisting of first, second, third and fourth arms of which the first arm is constituted by a photo-sensitive transducer responsive to said radiation, the second and third arms are adjustable resistive ration arms and the fourth arm is an adjustable balancing impedance, a null-balance detector connected to said bridge circuit to indicate balance thereof, a timing circuit, switch means arranged for switching said adjustable impedance, after the bridge is balanced, out of the bridge circuit and into said timing circuit, a power supply circuit for energizing said source of radiation, said switch means furthermore being arranged, when said adjustable impedance is connected into said bridge circuit, to connect said power supply circuit to energize said source of radiation, and said timing circuit being arranged, when said adjustable impedance is connected in said timing circuit, to connect said power supply circuit to said source for a period determined by said timing circuit and wherein said timing circuit contains a further adjustable element arranged for effecting adjustment by an adjustable multiplying factor of the time period determined by the adjustable impedance when switched into said timing circuit.

3. Exposure control apparatus as claimed in claim 2 wherein said adjustable impedance is an adjustable resistance and wherein said timing circuit includes a capacitance which is connected in series with said adjustable resistance when the latter is switched into said timing circuit and wherein there is provided a potential divider network including said further adjustable element; and wherein said capacitance and adjustable resistance, when switched into said timing circuit, are connected in shunt across part of said potential divider network so that said further adjustable element controls the potential to which said capacitor charges.

4. Exposure control apparatus as claimed in claim 2 wherein further switch means are provided for initiating operation of said timing circuit so that, on operation of said further switch means, said source is energized for a time determined by the impedance of said adjustable impedance.

5. Exposure control apparatus as claimed in claim 3 wherein said timing circuit includes a grid-controlled tube having a grid and a cathode, a grid circuit and a cathode current supply circuit and wherein said potential divider network is connected in series in said cathode circuit and wherein said capacitance is connected between said grid circuit and the end of said potential divider network remote from the cathode of said tube.

6. Exposure control apparatus as claimed in claim 5 wherein there are provided a further switch arranged, when operated, to apply a short circuit across said capacitance, and a relay responsive to the current flowing in the cathode circuit of said valve, said relay having a normally-closed contact in said power supply circuit for said source whereby said source is energized when the relay is de-energized by operating said further switch for a time period until said cathode current is restored to a level sufficient to energize said relay.

References Cited
UNITED STATES PATENTS
2,755,704    7/1956    Gilbert _____ 250—210 X
2,794,366    6/1957    Canaday _____ 88—24
3,222,983    11/1965    Ouchi _____ 88—24

FOREIGN PATENTS
529,907    11/1940    Great Britain.

NORTON ANSHER, *Primary Examiner.*
WAYNE A. SIVERTSON, *Asistant Examiner.*